United States Patent
Morioka et al.

(10) Patent No.: US 10,903,891 B2
(45) Date of Patent: *Jan. 26, 2021

(54) COMMUNICATION APPARATUS, COMMUNICATION METHOD, AND COMMUNICATION SYSTEM

(71) Applicant: SONY CORPORATION, Tokyo (JP)

(72) Inventors: Yuichi Morioka, Tokyo (JP); Ryota Kimura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/707,284

(22) Filed: Dec. 9, 2019

(65) Prior Publication Data

US 2020/0112358 A1 Apr. 9, 2020

Related U.S. Application Data

(63) Continuation of application No. 16/179,427, filed on Nov. 2, 2018, now Pat. No. 10,516,466, which is a
(Continued)

(30) Foreign Application Priority Data

May 8, 2009 (JP) ................................. 2009-113869

(51) Int. Cl.
*H04B 7/06* (2006.01)
*H04L 1/00* (2006.01)
(Continued)

(52) U.S. Cl.
CPC ......... *H04B 7/0697* (2013.01); *H04B 7/0452* (2013.01); *H04L 1/0008* (2013.01);
(Continued)

(58) Field of Classification Search
CPC ............... H04B 7/0697; H04B 7/0452; H04W 72/0446; H04L 69/322; H04L 5/00;
(Continued)

(56) References Cited

U.S. PATENT DOCUMENTS

| 6,721,302 B1 | 4/2004 | Alastalo |
| 8,498,245 B2 | 7/2013 | Wu et al. |

(Continued)

FOREIGN PATENT DOCUMENTS

| AU | 1261702 A | 5/2002 |
| CN | 1665195 A | 9/2005 |

(Continued)

OTHER PUBLICATIONS

Notice of Allowance for U.S. Appl. No. 16/179,427, dated Aug. 21, 2019, 10 pages.

(Continued)

*Primary Examiner* — Ashley Shivers
(74) *Attorney, Agent, or Firm* — Chip Law Group

(57) ABSTRACT

Even when the lengths of data items to be transmitted to users are not the same, the frames multiplexed at the same time finally have the same frame length and are transmitted. Even when the lengths of frames for the users are not the same at the time when a transmission request is received from a higher layer, a communication apparatus reconfigures at least two of the frames having short lengths into a frame having a long length through Aggregation so that the frames finally have the same frame length and transmits the frames at the same time in a multiplexed manner. On the transmitter side, the transmission power used per destination communication station can be increased due to a decrease in the total number of multiplexed frames. On the receiver side, an unstable AGC operation can be prevented.

12 Claims, 7 Drawing Sheets

Related U.S. Application Data continuation of application No. 15/791,502, filed on Oct. 24, 2017, now Pat. No. 10,153,822, which is a continuation of application No. 15/471,068, filed on Mar. 28, 2017, now Pat. No. 9,847,826, which is a continuation of application No. 14/482,064, filed on Sep. 10, 2014, now Pat. No. 9,712,336, which is a continuation of application No. 13/266,142, filed as application No. PCT/JP2010/056920 on Apr. 19, 2010, now Pat. No. 8,929,286.

(51) Int. Cl.
| | |
|---|---|
| H04L 12/28 | (2006.01) |
| H04L 5/00 | (2006.01) |
| H04W 28/06 | (2009.01) |
| H04B 7/0452 | (2017.01) |
| H04W 52/34 | (2009.01) |
| H04W 72/04 | (2009.01) |
| H04W 84/12 | (2009.01) |

(52) U.S. Cl.
CPC ........ *H04L 5/0001* (2013.01); *H04L 12/2838* (2013.01); *H04W 28/06* (2013.01); *H04W 52/346* (2013.01); *H04W 72/0446* (2013.01); *H04B 7/0617* (2013.01); *H04W 84/12* (2013.01)

(58) Field of Classification Search
CPC ............... H04L 5/0001; H04L 12/2838; H04L 2209/20; H04L 1/0008
See application file for complete search history.

(56) References Cited

U.S. PATENT DOCUMENTS

| | | |
|---|---|---|
| 2001/0049295 A1 | 12/2001 | Matsuoka et al. |
| 2005/0135318 A1 | 6/2005 | Walton et al. |
| 2005/0152314 A1 | 7/2005 | Sun et al. |
| 2005/0249183 A1 | 11/2005 | Danon et al. |
| 2006/0092871 A1 | 5/2006 | Nishibayashi et al. |
| 2006/0139201 A1 | 6/2006 | Nagata et al. |
| 2007/0047574 A1 | 3/2007 | Ling |
| 2007/0153757 A1 | 7/2007 | Kim et al. |
| 2007/0217378 A1 | 9/2007 | Moorti et al. |
| 2007/0230493 A1 | 10/2007 | Dravida et al. |
| 2007/0242745 A1 | 10/2007 | Choi et al. |
| 2007/0286149 A1 | 12/2007 | Yamamoto et al. |
| 2007/0291793 A1 | 12/2007 | Jang et al. |
| 2008/0043731 A1 | 2/2008 | Lim et al. |
| 2008/0101332 A1 | 5/2008 | Kim et al. |
| 2008/0259957 A1 | 10/2008 | Kliger et al. |
| 2009/0010263 A1 | 1/2009 | Ma et al. |
| 2009/0141723 A1 | 6/2009 | Giesberts et al. |
| 2009/0147719 A1 | 6/2009 | Kang |
| 2009/0196364 A1 | 8/2009 | Nakajima et al. |
| 2009/0290600 A1 | 11/2009 | Tatsuta et al. |
| 2010/0014463 A1 | 1/2010 | Nagai et al. |
| 2010/0050054 A1 | 2/2010 | Abraham et al. |
| 2010/0112960 A1 | 5/2010 | Shao et al. |
| 2012/0039257 A1 | 2/2012 | Morioka et al. |
| 2012/0099530 A1 | 4/2012 | Morioka et al. |
| 2014/0376504 A1 | 12/2014 | Morioka et al. |

FOREIGN PATENT DOCUMENTS

| | | |
|---|---|---|
| CN | 101087182 A | 12/2007 |
| CN | 101548488 A | 9/2009 |
| EP | 1865672 A2 | 12/2007 |
| EP | 2104245 A1 | 9/2009 |
| JP | 2855172 B2 | 2/1992 |
| JP | 2001-148646 A | 5/2001 |
| JP | 2001-309424 A | 11/2001 |
| JP | 2004-328570 A | 11/2004 |
| JP | 2004-350259 A | 12/2004 |
| JP | 2006-013982 A | 1/2006 |
| JP | 2007-089113 A | 4/2007 |
| JP | 2007-208522 A | 8/2007 |
| JP | 2008-236065 A | 10/2008 |
| JP | 2009-506679 A | 2/2009 |
| JP | 4760557 B2 | 8/2011 |
| KR | 10-2007-0078683 A | 8/2007 |
| KR | 10-2008-0007529 A | 1/2008 |
| KR | 10-2009-0080551 A | 7/2009 |
| WO | 2002/041647 A2 | 5/2002 |
| WO | 2004/114608 A1 | 12/2004 |
| WO | 2004/114609 A1 | 12/2004 |
| WO | 2005/013576 A1 | 2/2005 |
| WO | 2005/027555 A1 | 3/2005 |
| WO | 2007/025160 A2 | 3/2007 |
| WO | 2008/069245 A1 | 6/2008 |
| WO | 2009/026400 A1 | 2/2009 |

OTHER PUBLICATIONS

Notice of Allowance for U.S. Appl. No. 15/791,502, dated Aug. 3, 2018, 10 pages.
Notice of Allowance for U.S. Appl. No. 15/471,068, dated Aug. 7, 2017, 12 pages.
Notice of Allowance for U.S. Appl. No. 15/471,068, dated Nov. 16, 2017, 02 pages.
Non-Final Office Action for U.S. Appl. No. 14/482,064, dated Apr. 15, 2016, 10 pages.
Final Office Action for U.S. Appl. No. 14/482,064, dated Oct. 6, 2016, 14 pages.
Notice of Allowance for U.S. Appl. No. 14/482,064, dated Feb. 9, 2017, 11 pages.
Notice of Allowance for U.S. Appl. No. 14/482,064, dated Jun. 14, 2017, 02 pages.
Non-Final Office Action for U.S. Appl. No. 13/266,142, dated Jun. 13, 2013, 10 pages.
Final Office Action for U.S. Appl. No. 13/266,142, dated Nov. 21, 2013, 34 pages.
Notice of Allowance for U.S. Appl. No. 13/266,142, dated Sep. 16, 2014, 08 pages.
Extended European Search Report of EP Patent Application No. 18203343.1, dated Feb. 5, 2019, 07 pages.
Nagai, et al., "324Mbps Ultra High Speed Wireless LAN Prototype (5): Frame Aggregation", Institute of Electronics, Information, and Communication Engineers, NII—Electronic Library Service, B-5-210, 2005, 02 pages.
Shuichi Obayashi, "Standardization and Technical Proposals in IEEE 802.11n", The Institute of Electronics, Information, and Communication Engineers, IEICE Technical Report, vol. 016, No. 42, May 2006, pp. 43-48.
Parthasarathy, et al., "A Novel Adaptive Scheme to Improve the Performance of the IEEE 802.11n WLANs", 21st International Conference on Advanced Information Networking and Applications Workshops (AINAW'07), IEEE Department of Computer Science, University of Cincinnati, 2007, 07 pages.
Office Action for CN Patent Application No. 201080019208.8, dated Sep. 26, 2013.
Office Action for JP Patent Application No. 2009-113869, dated Mar. 12, 2013.
International Search Report and Written Opinion of PCT Application No. PCT/JP2010/056920, dated May 18, 2010, 06 pages of English Translation and 06 pages of ISRWO.
Extended European Search Report of EP Patent Application No. 17153743.4, dated May 4, 2017, 07 pages.
Extended European Search Report of EP Patent Application No. 10772144.1, dated Feb. 26, 2016, 07 pages.
Office Action for KR Patent Application No. 10-2011-7025957, dated Apr. 21, 2016, 07 pages of Office Action and 33 pages of English Translation.
Office Action for JP Patent Application No. 2013-100857, dated Jan. 14, 2014, 06 pages of Office Action.
Office Action for JP Patent Application No. 2014-168612, dated Jun. 2, 2015.

(56) References Cited

OTHER PUBLICATIONS

International Preliminary Report on Patentability of PCT Application No. PCT/JP2010/056920, dated Nov. 17, 2011, 06 pages of English Translation and 03 pages of IPRP.

COMMUNICATION APPARATUS, COMMUNICATION METHOD, AND COMMUNICATION SYSTEM

CROSS-REFERENCE TO RELATED APPLICATIONS

The present application is a continuation application of U.S. patent application Ser. No. 16/179,427, filed Nov. 2, 2018 which is a continuation application of U.S. patent application Ser. No. 15/791,502, filed Oct. 24, 2017, now U.S. Pat. No. 10,153,822, which is a continuation application of U.S. patent application Ser. No. 15/471,068, filed Mar. 28, 2017, now U.S. Pat. No. 9,847,826, which is a continuation application of U.S. patent application Ser. No. 14/482,064, filed Sep. 10, 2014, now U.S. Pat. No. 9,712,336, which is a continuation application of U.S. patent application Ser. No. 13/266,142, filed Oct. 25, 2011, now U.S. Pat. No. 8,929,286, which is a National Stage Entry of PCT/JP2010/056920, filed Apr. 19, 2010, and claims the benefit of priority from prior Japanese Patent Application JP2009-113869, filed May 8, 2009, the entire content of which is hereby incorporated by reference.

TECHNICAL FIELD

The present invention relates to a communication apparatus, a communication method, a computer program, and a communication system that employ Space Division Multiple Access (SDMA) in which a plurality of users share wireless resources on a spatial axis and, in particular, to a communication apparatus, a communication method, a computer program, and a communication system that multiplex frames having a variable length frame format and destined for a plurality of users and transmit the frames.

BACKGROUND ART

Wireless communication has been developed and used as a communication technique for eliminating a wiring operation required in existing wired communication and further realizing mobile communication. For example, an example of the standard for a wireless LAN (Local Area Network) is IEEE (The Institute of Electrical and Electronics Engineers) 802.11. IEEE 802.11a/g has already been widespread.

The IEEE 802.11a/g standard supports a modulation method that realizes a maximum communication speed (the physical layer data rate) of 54 Mbps using Orthogonal Frequency Division Multiplexing (OFDM) in the 2.4 GHz band or the 5 GHz band. In addition, in the IEEE 802.11n standard, which is an extension of the IEEE 802.11a/g standard, a higher bit rate is realized by employing the MIMO (Multi-Input Multi-Output) communication scheme. The MIMO communication scheme is a communication scheme (an existing communication scheme) that realizes a spatially multiplexed stream using a transmitter and a receiver each including a plurality of antennas. IEEE 802.11n can provide a high throughput that is higher than 100 Mbps. However, with an increase in the amount of information of transmitted content, a higher bit rate is required.

For example, by increasing the number of antennas of the MIMO communication devices and increasing the number of spatially multiplexed streams, the throughput of peer-to-peer communication can be increased while maintaining downward compatibility. However, in the future, the throughput of communication among a plurality of user's needs to be increased in addition to increasing the throughput per user in communication.

The working group of IEEE 802.11ac attempts to establish a wireless LAN standard that uses a frequency band lower than or equal to 6 GHz and that realizes a data transmission speed that is higher than 1 Gbps. In order to realize such a wireless LAN standard, a space division multiple access scheme in which a plurality of users share wireless resource on the spatial axis, such as multi-user MIMO (MU-MIMO) or SDMA (Space Division Multiple Access), is a promising scheme.

Currently, space division multiple access is developed as one of base technologies for a next-generation cell phone system based on Time Division Multiple Access (TDMA), such as PHS (Personal Handyphone System) or LTE (Long Term Evolution). In addition, in the wireless LAN technical field, one-to-many communication garners much attention, as described above. However, few applications are available in this field. One of the reasons for that is that it is difficult to efficiently multiplex a plurality of users in packet communication.

Note that a communication system has been developed by using an RTS packet, a CTS packet, and an ACK packet that have a packet format having downward compatibility with IEEE 802.11 and combining the following two techniques: carrier sense of the existing IEEE 802.11 standard and space division multiple access using an adaptive array antenna (refer to, for example, PTL 1).

When the space division multiple access scheme is applied to a wireless LAN, a variable length frame may be multiplexed on the same time axis. At that time, if the lengths of data items transmitted to all of the plurality of users are the same, no problem arises. However, if the lengths of all frames to be multiplexed are not the same due to a difference among the lengths of transmitted data, the level of frame multiplexing during a transmission interval is decreased or increased and, therefore, the total transmission power is abruptly changed. If frames having different lengths are directly multiplexed and transmitted, the received power is abruptly changed on the receiver side due to an increase or a decrease in the level of frame multiplexing. Thus, an unstable operation occurs in terms of auto gain control (AGC). In this way, a variety of problems may arise (e.g., the power distribution in a frame in terms of an RCPI (Received Channel Power Indicator) defined in IEEE 802.11 varies). Accordingly, even when the lengths of data items transmitted to the users are not the same, the frames multiplexed on the same time axis need to be finally transmitted while keeping the same frame length.

For example, in the systems having a fixed frame format (such as an existing cellar system), a frame, for example, can be padded by inserting diversity data (refer to, for example, PTL 2), scheduling assigned times (refer to, for example, PTL 3), using a variable data rate (refer to, for example, PTL 4 or 5), or using a variable channel configuration (refer to, for example, PTL 6). However, since the configuration of such a system radically differs from the configuration of a system using a variable length frame format, such as a wireless LAN system, it is difficult to apply such existing technologies to the system using a variable length frame format.

CITATION LIST

Patent Literature

PTL 1: Japanese Unexamined Patent Application Publication No. 2004-328570

PTL 2: Japanese Unexamined Patent Application Publication No. 2001-148646

PTL 3: Japanese Unexamined Patent Application Publication No. 2009-506679

PTL 4: Japanese Unexamined Patent Application Publication No. 2008-236065

PTL 5: Japanese Patent No. 2855172

PTL 6: Japanese Unexamined Patent Application Publication No. 2007-89113

DISCLOSURE OF INVENTION

Technical Problem

It is an object of the present invention to provide excellent communication apparatus, communication method, computer program, and communication system capable of appropriately performing a communication operation using the space division multiple access in which a plurality of users share wireless resources on the spatial axis. It is another object of the present invention to provide excellent communication apparatus, communication method, computer program, and communication system capable of multiplexing frames having a variable length frame format and destined for a plurality of users and optimally transmitting the frames.

It is still another object of the present invention to provide excellent communication apparatus, communication method, computer program, and communication system capable of suitably transmitting frames having a variable-length frame format in a multiplexed manner while avoiding an abrupt change in the total transmission power on the transmitter side even when the lengths of transmission data items destined for a plurality of users are not the same.

Solution to Problem

In order to solve the above-described problems, the present invention is provided. According to the invention described in claim 1, a communication apparatus includes a frame generating unit configured to generate a plurality of frames to be transmitted at the same time, a frame integration processing unit configured to integrate at least two of the frames generated by the frame generating unit into a single frame, and a communication unit configured to transmit the frames at the same time in a multiplexed manner.

According to the invention described in claim 2, the communication apparatus according to claim 1 further includes a frame length control unit configured to adjust the lengths of the plurality of frames multiplexed at the same time so that the lengths are finally made the same.

According to the invention described in claim 3, the frame length control unit of the communication apparatus according to claim 2 integrates at least two frames having short lengths into a single frame having a long length.

According to the invention described in claim 4, the communication unit of the communication apparatus according to claim 3 includes a plurality of antenna elements capable of functioning as an adaptive array antenna by assigning weights to the antenna elements and can transmit the plurality of frames at the same time in a multiplexed manner. In addition, if the lengths of the frames are not the same, the frame length control unit extracts a combination of communication apparatuses appropriate for combining the antenna weights from among the communication apparatuses defined as destinations of the frames and adjusts the lengths of the frames by integrating the frames destined for the communication apparatuses in the combination using the frame integration processing unit.

According to the invention described in claim 5, if the frame length control unit of the communication apparatus according to claim 4 is finally unable to make the frame lengths the same through frame integration, the frame length control unit appropriately performs padding on the frame having a short length so that the frames finally have the same length.

According to the invention described in claim 6, a communication method includes a frame generating step of generating a plurality of frames to be transmitted at the same time, a frame integration processing step of integrating at least two of the frames generated in the frame generating step into a single frame, and a communication step of transmitting the plurality of frames at the same time in a multiplexed manner.

According to the invention described in claim 7, a computer program written in a computer-readable format so that a process for a communication apparatus to transmit a frame is executed by a computer is provided. The program includes code causing the computer to functions as a frame generating unit configured to generate a plurality of frames to be transmitted at the same time, a frame integration processing unit configured to integrate at least two of the frames generated by the frame generating unit into a single frame, and a communication unit configured to transmit the plurality of frames at the same time in a multiplexed manner.

The computer program according to claim 7 defines a computer program written into a computer-readable format so that a predetermined process is performed by a computer. That is, by installing the computer program according to claim 7 of the invention in a computer, cooperative processes are performed in the computer. Thus, the operations and advantages that are the same as those of the communication apparatus according to claim 1 of the invention can be obtained.

In addition, as used herein, the term "system" refers to a logical combination of a plurality of devices (or functional modules that each realizes a particular function); the plurality of devices or functional modules are not necessarily included in one body. According to the invention described in claim 8, a communication system includes a first communication apparatus configured to integrate at least two frames among a plurality of frames to be transmitted at the same time into a single frame and transmit the frames at the same time in a multiplexed manner and a plurality of second communication apparatuses configured to receive the frames multiplexed at the same time.

Advantageous Effects of Invention

According to the present invention, excellent communication apparatus, communication method, computer program, and communication system capable of appropriately performing a communication operation using the space division multiple access in which a plurality of users share wireless resources on the spatial axis can be provided.

Furthermore, according to the present invention, excellent communication apparatus, communication method, computer program, and communication system capable of suitably transmitting frames having a variable-length frame format in a multiplexed manner while avoiding an abrupt change in the total transmission power on the transmitter side even when the lengths of transmission data items destined for a plurality of users are not the same can be provided.

According to the invention described in claims 1 and claims 6 to 8, when a communication apparatus multiplexes a plurality of frames at the same time and transmits the frames, a process for integrating at least two frames among the plurality of frames into a single frame, that is, Aggregation, can be performed as needed. By employing a frame integration process in the space division multiple access scheme, the total number of multiplexed frames can be reduced. Accordingly, the transmission power per communication station defined as a destination is increased on the transmission side, and an increase in the communication quality can be expected.

According to the invention described in claim 2, even when the lengths of frames destined for the users are not the same when a transmission request is delivered from a higher layer, the frames multiplexed at the same time can be finally made the same and can be transmitted. Accordingly, frames having a variable-length frame format can be multiplexed and appropriately transmitted while avoiding an abrupt change in the total transmission power on the transmission side. As a result, on the reception side that receives the multiplexed frames, an unstable AGC operation due to an abrupt change in the received power can be prevented.

According to the invention described in claim 3, by integrating at least two frames having short lengths into a frame having a long length, the frames multiplexed at the same time can finally have the same length and can be transmitted. Accordingly, frames having a variable-length frame format can be appropriately multiplexed and transmitted while avoiding an abrupt change in the total transmission power on the transmission side. As a result, on the reception side that receives the multiplexed frames, an unstable AGC operation due to an abrupt change in the received power can be prevented.

According to the invention described in claim 4, in a communication apparatus that performs a space division multiple access using an adaptive array antenna, by extracting, from among communication apparatuses defined as destinations of a plurality of frames transmitted in a multiplexed manner, a combination of the communication apparatuses appropriate for combining the antenna weights, the frame integration processing unit can integrate the frames destined for the communication apparatuses in the combination and adjust the frame lengths. That is, by combining Aggregation of frames with the space division multiple access scheme, overhead can be reduced and the throughput of one-to-many communication can be increased at the same time.

According to the invention described in claim 5, even when the lengths of the frames cannot be finally made the same through integration of the frames, the frame lengths can be finally made the same through a padding process performed on the frames having short lengths as needed. Therefore, the transmission power per frame can be increased by reducing the total number of multiplexed frames through Aggregation of the frames. In addition, by making the frame lengths the same, an unstable AGC operation on the receiver side can be prevented.

Further features and advantages of the present invention will become apparent from the following detailed description of exemplary embodiments of the present invention with reference to the attached drawings.

DESCRIPTION OF EMBODIMENTS

Embodiments of the present invention are described in detail below with reference to the accompanying drawings.

Figure 1:
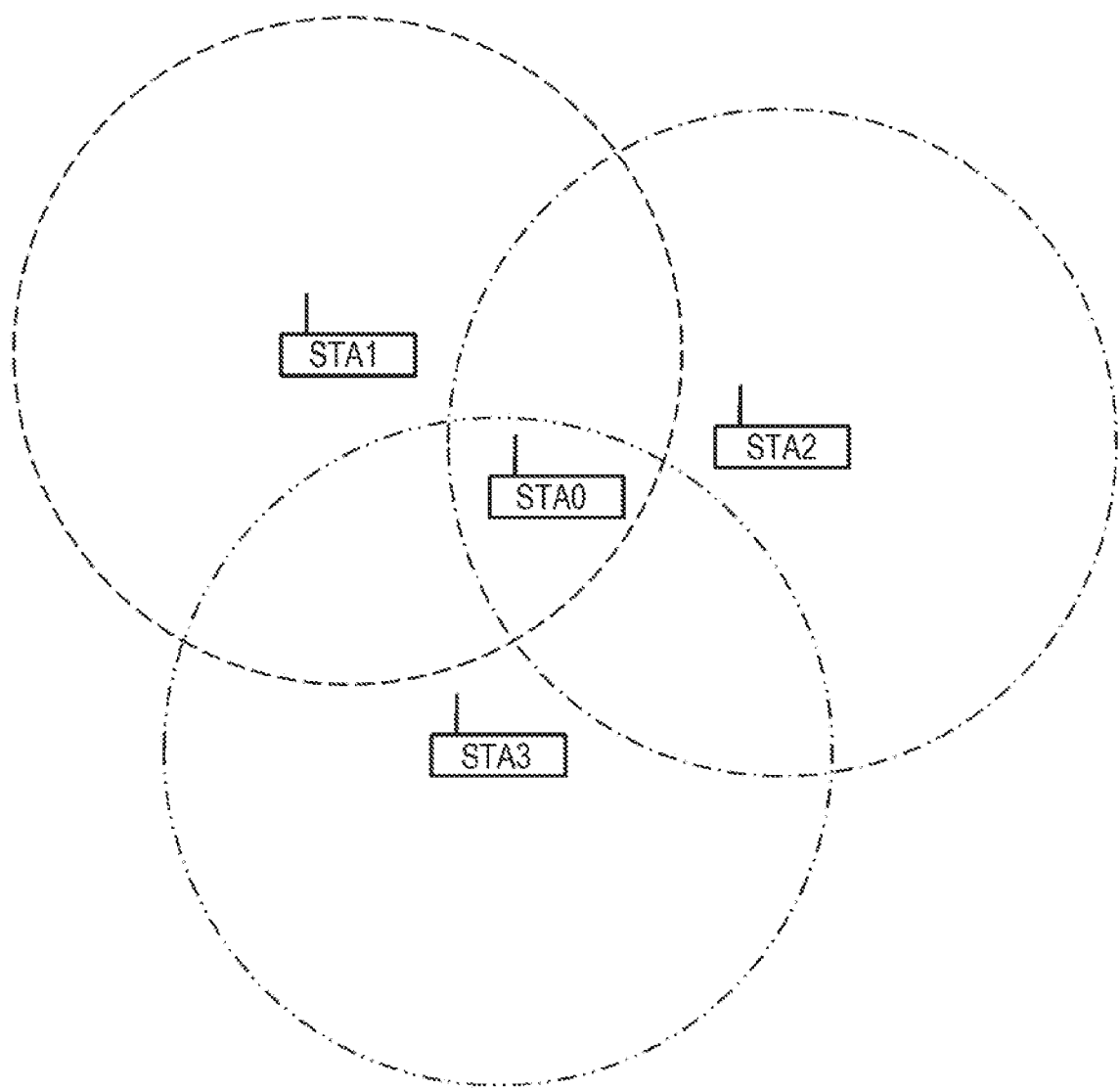
FIG. 1 is a schematic illustration of the configuration of a communication system according to an embodiment of the present invention.

FIG. 1 is a schematic illustration of the configuration of a communication system according to an embodiment of the present invention. The communication system illustrated in the drawing includes a communication station STA0 operating as an access point (AP) and a plurality of communication stations STA1, STA2, and STA3 each operating as a client device (MT).

The communication area of each of the communication stations STA1, STA2, and STA3 includes the communication station STA0, and each of the communication stations STA1, STA2, and STA3 can directly communicate with the communication station STA0 (that is, the communication stations STA1, STA2, and STA3 are controlled by the communication station STA0 serving as an access point and form a BSS (Basic Service Set)). However, each of the communication stations STA1, STA2, and STA3 serving as client devices need not be located within the communication areas of the other communication stations. Hereinafter, direct communication among the client devices is not discussed.

Here, the communication station STA0 serving as an access point is formed from a communication apparatus that includes a plurality of antennas and performs the space division multiple access using an adaptive array antenna.

The communication station STA0 assigns wireless resources on the spatial axis to the plurality of users and multiplexes frame communication. That is, the communication station STA0 is a communication apparatus that complies with a new standard such as IEEE 802.11ac. The communication station STA0 multiplexes two or more frames destined for different communication stations on the same time axis and separates a frame destined for the communication station STA0 and multiplexed for two or more communication stations into frames for the source communication stations. In this way, the communication station STA0 performs one-to-many frame communication. The communication station STA0 can increase the number of client devices capable of performing the space division multiple access by increasing the number of antennas thereof. Of course, in addition to performing one-to-many frame communication with the communication stations STA1, STA2, and STA3 using the space division multiple access, the communication station STA0 may perform pier-to-pier communication with each of the communication stations STA1, STA2, and STA3.

In contrast, each of the communication stations STA1, STA2, and STA3 serving as a client device is formed from a communication apparatus that includes a plurality of antennas and performs the space division multiple access using an adaptive array antenna. However, user separation is performed only when a receiving operation is performed. When a transmitting operation is performed, user separation, that is, multiplexing of transmission frames is not performed. Accordingly, the number of antennas may be less than that of the access points. Note that at least some of the client devices under the control of the communication station STA0 serving as an access point may be communication apparatuses that comply with the existing standard, such as IEEE 802.11a. That is, the communication system illustrated in FIG. 1 is in an environment in which communication apparatuses that comply with the new standard coexist with communication apparatuses that comply with an existing standard.

Figure 2:
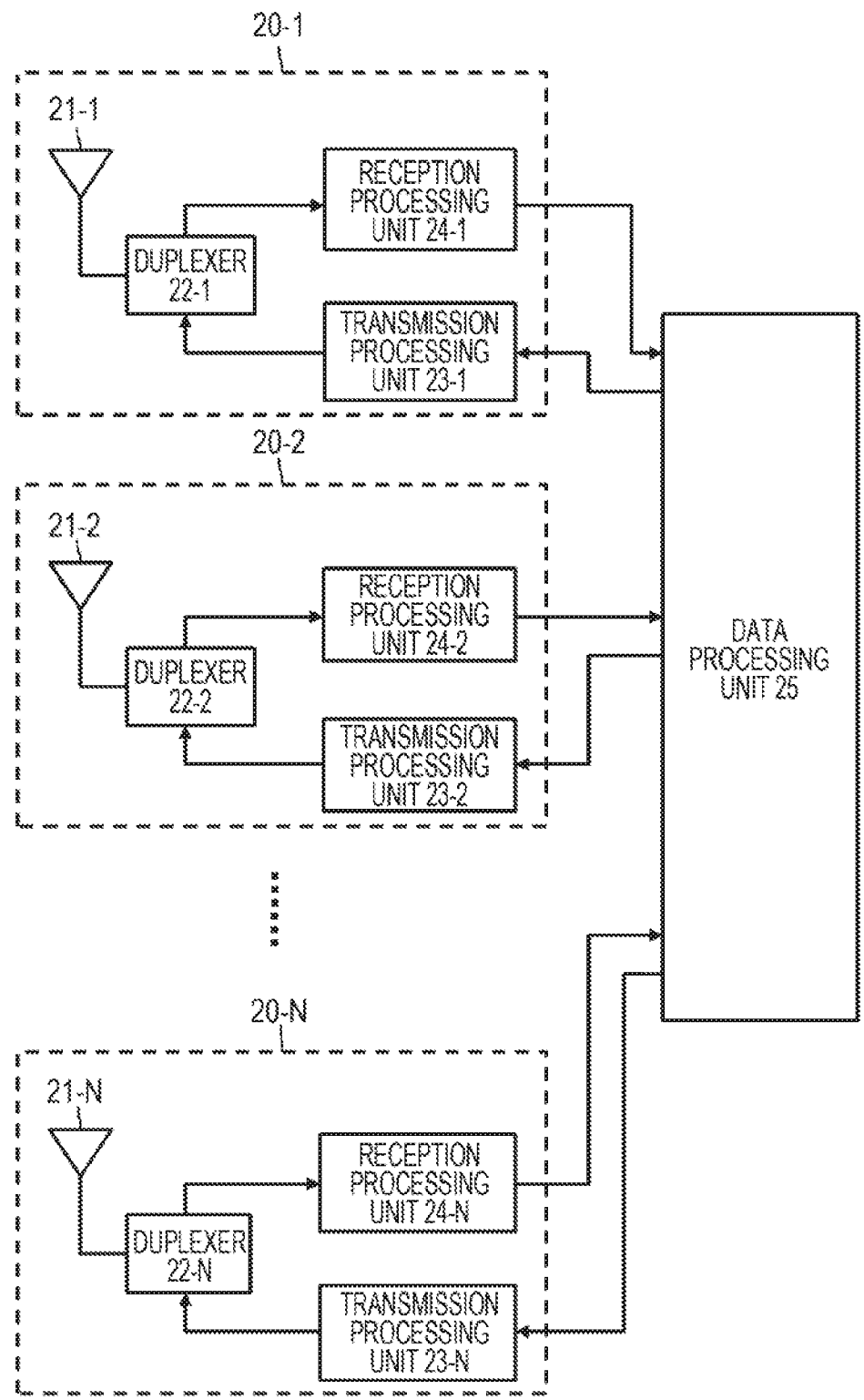
FIG. 2 illustrates an example of the configuration of a communication apparatus capable of multiplexing a plurality of users through space division multiple access.

FIG. 2 illustrates an example of the configuration of a communication apparatus capable of multiplexing a plurality of users through space division multiple access. Among the communication stations in the communication system illustrated in FIG. 1, the communication station STA0 serving as an access point and any one of the communication stations STA1 to STA3 that serves as a client device and that employs the space division multiple access scheme have the configuration illustrated in FIG. 2 and perform a communication operation in accordance with the new standard.

The communication apparatus illustrated in the drawing includes N transmitting and receiving branches 20-1, 20-2, . . . , and 20-N having antenna elements 21-1, 21-2, . . . , and 21-N, respectively, and a data processing unit 25 connected to the transmitting and receiving branches 20-1, 20-2, . . . , and 20-N (where N is an integer greater than or equal to 2). The data processing unit 25 processes data to be transmitted and received data. When appropriate weights for an adaptive array antenna are assigned to the plurality of antenna elements 21-1, 21-2, . . . , and 21-N, the antenna elements 21-1, 21-2, . . . , and 21-N can function as an adaptive array antenna. The communication station STA0 serving as the access point performs the space division multiple access using the adaptive array antenna. By increasing the number of antenna elements included therein, the communication station STA0 can increase the number of client devices included in the multiple access.

In the transmitting and receiving branches 20-1, 20-2, . . . , and 20-N, the antenna elements 21-1, 21-2, . . . , and 21-N are connected to transmission processing units 23-1, 23-2, . . . , and 23-N and reception processing units 24-1, 24-2, . . . , and 24-N via duplexers 22-1, 22-2, . . . , and 22-N, respectively.

The data processing unit 25 generates data to be transmitted in response to a transmission request received from a higher-layer application and, thereafter, sorts the data into the transmitting and receiving branches 20-1, 20-2, . . . , and 20-N. In addition, in the communication station STA0 serving as an access point, the data processing unit 25 generates a plurality of data items to be transmitted to the plurality of users, that is, data item to be transmitted to the communication stations STA1, STA2, and STA3 in response to a transmission request received from a higher-layer application and, thereafter, multiplies the data item by a transmission weight of the adaptive array antenna for each of the transmitting and receiving branches. In this way, the data items are spatially separated and sorted into the transmitting and receiving branches 20-1, 20-2, . . . , and 20-N. Note that as used herein, the term "spatial separation" in transmission refers to only user separation in which frames transmitted at the same time are spatially separated for the users.

Each of the transmission processing units 23-1, 23-2, . . . , and 23-N performs predetermined signal processing, such as encoding and modulation, on a digital baseband transmission signal supplied from the data processing unit 25 and, thereafter, performs D/A conversion on the digital baseband transmission signal. Subsequently, each of the transmission processing units 23-1, 23-2, . . . , and 23-N upconverts the digital baseband transmission signal into an RF (Radio Frequency) signal. Thus, the power of the signal is amplified. Subsequently, such transmission RF signals are supplied to the antenna elements 21-1, 21-2, . . . , and 21-N via the duplexers 22-1, 22-2, . . . , and 22-N. Thus, the transmission RF signals are emitted into the air.

In contrast, upon receiving the RF reception signals from the antenna elements 21-1, 21-2, . . . , and 21-N via the duplexers 22-1, 22-2, . . . , and 22-N, the reception processing units 24-1, 24-2, . . . , and 24-N low-noise amplify the RF reception signals. Thereafter, the reception processing units 24-1, 24-2, . . . , and 24-N down-convert the RF reception signals into analog baseband signals and D/A-convert the analog baseband signals. Furthermore, the reception processing units 24-1, 24-2, . . . , and 24-N perform predetermined signal processing, such as decoding and demodulation, on the analog baseband signals.

The data processing unit 25 multiplies the digital reception signal input from each of the reception processing units 24-1, 24-2, . . . , and 24-N by a reception weight of the adaptive array antenna and performs spatial separation. In this way, the transmission data items transmitted from the users, that is, the communication stations STA1, STA2, and STA3, are reconstructed. Thereafter, the data processing unit 25 delivers the reconstructed transmission data items to a higher-layer application. Note that as used herein, the term "spatial separation" in reception refers to user separation in which frames transmitted at the same time are spatially separated for the users and channel separation in which a spatially multiplexed MIMO channel is separated into the original multiple streams.

At that time, in order to cause the antenna elements 21-1, 21-2, . . . , and 21-N to function as an adaptive array antenna, the data processing unit 25 controls the transmission processing units 23-1, 23-2, . . . , and 23-N and the reception processing units 24-1, 24-2, . . . , and 24-N so that the transmission data items sorted into the transmitting and receiving branches 20-1, 20-2, . . . , and 20-N are multiplied by the transmission weights of the adaptive array antenna and the reception data items received from the transmitting and receiving branches 20-1, 20-2, . . . , and 20-N are multiplied by the reception weights of the adaptive array antenna. In addition, before performing the space division multiple access with the communication stations STA1, STA2, and STA3, the data processing unit 25 learns the weights of the adaptive array antenna. For example, the data processing unit 25 can learn the weights of the adaptive array antenna using training signals (described in more detail below) received from the communication partners STA1, STA2, and STA3 in a known sequence and a predetermined adaptive algorithm, such as an RLS (Recursive Least Square) algorithm.

For example, the data processing unit 25 performs a process in each of the layers of a communication protocol of a media access control (MAC) technique implemented in the communication system illustrated in FIG. 1. In addition, for example, the transmitting and receiving branches 20-1, 20-2, . . . , and 20-N perform a process corresponding to a PHY layer. As described below, frames having different lengths are transmitted from a higher layer. At that time, the lengths of the frames finally transmitted from the PHY layer are made the same. Note that such control of the lengths of the frames can be performed by either the data processing unit 25 or the transmitting and receiving branches 20-1, 20-2, . . . , and 20-N.

Note that each of the communication stations STA1, STA2, and STA3 serving as client devices has a plurality of antennas and performs space division multiple access using an adaptive array antenna. At that time, each of the communication stations STA1, STA2, and STA3 performs user separation in only reception and does not perform user separation in transmission, that is, transmission frame multiplexing. Accordingly, each of the communication stations STA1, STA2, and STA3 need not have as many antennas as the access point.

Figure 3:
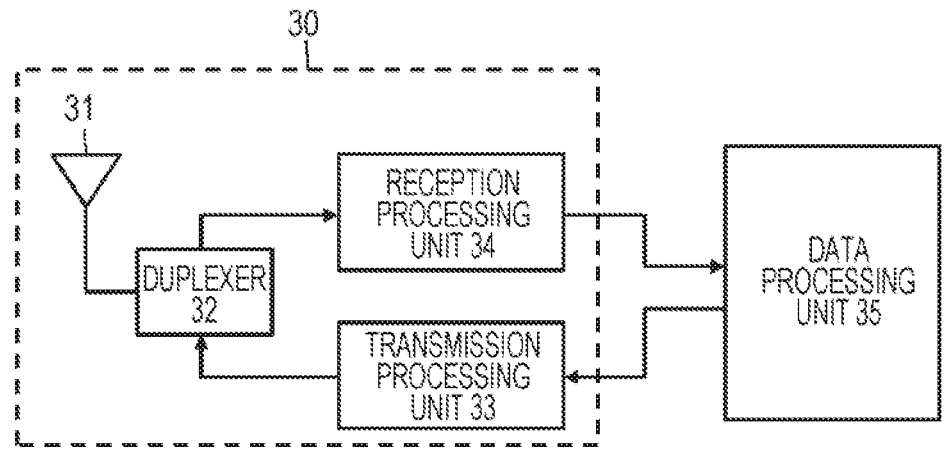
FIG. 3 illustrates an example of the configuration of a communication apparatus that complies with an existing standard, such as IEEE 802.11a, and that does not use the space division multiple access.

In addition, FIG. 3 illustrates an example of the configuration of a communication apparatus that complies with an existing standard, such as IEEE 802.11a, and that does not use the space division multiple access scheme. Among the client devices under the control of the communication station STA0 serving as an access point in the communication system illustrated in FIG. 1, a client device that has the configuration illustrated in FIG. 3 and that performs communication in accordance with only an existing standard is present.

The communication apparatus illustrated in the drawing includes a transmitting and receiving branch 30 having an antenna element 31 and a data processing unit 35 that is connected to the transmitting and receiving branch 30 and that processes data to be transmitted and received data. In addition, in the transmitting and receiving branch 30, the antenna element 31 is connected to a transmission processing unit 33 and a reception processing unit 34 via a duplexer 32.

The data processing unit 35 generates data to be transmitted in response to a transmission request received from a higher-layer application and, thereafter, outputs the data to the transmitting and receiving branch 30. The transmission processing unit 33 performs predetermined signal processing, such as encoding and modulation, on a digital baseband transmission signal and, thereafter, performs D/A conversion on the digital baseband transmission signal. Subsequently, the data processing unit 35 upconverts the digital baseband transmission signal into an RF signal. Thus, the power of the signal is amplified. Subsequently, such a transmission RF signal is supplied to the antenna element 31 via the duplexer 32. Thereafter, the transmission RF signal is emitted into the air.

In contrast, upon receiving the RF reception signal from the antenna element 31 via the duplexer 32, the reception processing unit 34 low-noise amplifies the RF reception signal. Thereafter, the reception processing unit 34 downconverts the RF reception signals into an analog baseband signal and D/A-converts the analog baseband signal. Furthermore, the reception processing unit 34 performs predetermined signal processing, such as predetermined decoding and demodulation, on the analog baseband signal. The data processing unit 35 reconstructs the original transmission data from the digital reception signal input from the reception processing unit 34 and delivers the original transmission data to a higher-layer application.

In the communication system illustrated in FIG. 1, the communication station STA0 serving as an access point multiplies a plurality of antenna elements 21-1, 21-2, . . . , and 21-N by the weights of an adaptive array antenna. Thus, the communication station STA0 causes the antenna elements 21-1, 21-2, . . . , and 21-N to function as an adaptive array antenna. In this way, the directivities for the communication stations STA1 to STA3 can be formed. As a result, the wireless resources on the spatial axis can be separated for the users, and a plurality of frames destined for the communication stations STA1 to STA3 can be multiplexed and transmitted at the same time. In addition, by functioning as an adaptive array antenna, the communication station STA0 can separate the frames transmitted from the communication stations STA1 to STA3 at the same time for the users and perform a reception process.

At that time, in order for the antenna elements 21-1, 21-2, . . . , and 21-N to function as an adaptive array antenna, the weights of the adaptive array antenna need to be learned in advance. For example, the communication station STA0 can learn the weights of the adaptive array antenna by acquiring a transfer function from training signals received from the communication stations STA1 to STA3 in a known sequence. Alternatively, the communication station STA0 can directly learn the weights of the adaptive array antenna using training signals received from a plurality of the communication partners in a known sequence and a predetermined adaptive algorithm, such as an RLS (Recursive Least Square) algorithm.

In either of the above-described techniques, the communication station STA0 that learns the weights of an adaptive array antenna needs to receive training signals from the communication stations STA1 to STA3. In addition, in a communication environment in which a communication apparatus that complies with only an existing standard exists, a normal frame exchange sequence needs to be executed while avoiding collision of carriers. Similarly, the training signals need to be transmitted while avoiding interference with the communication apparatus that complies with only an existing standard. That is, the communication station STA0 needs to learn the weights of the adaptive array antenna while maintaining downward compatibility with the existing standard.

Figure 4:
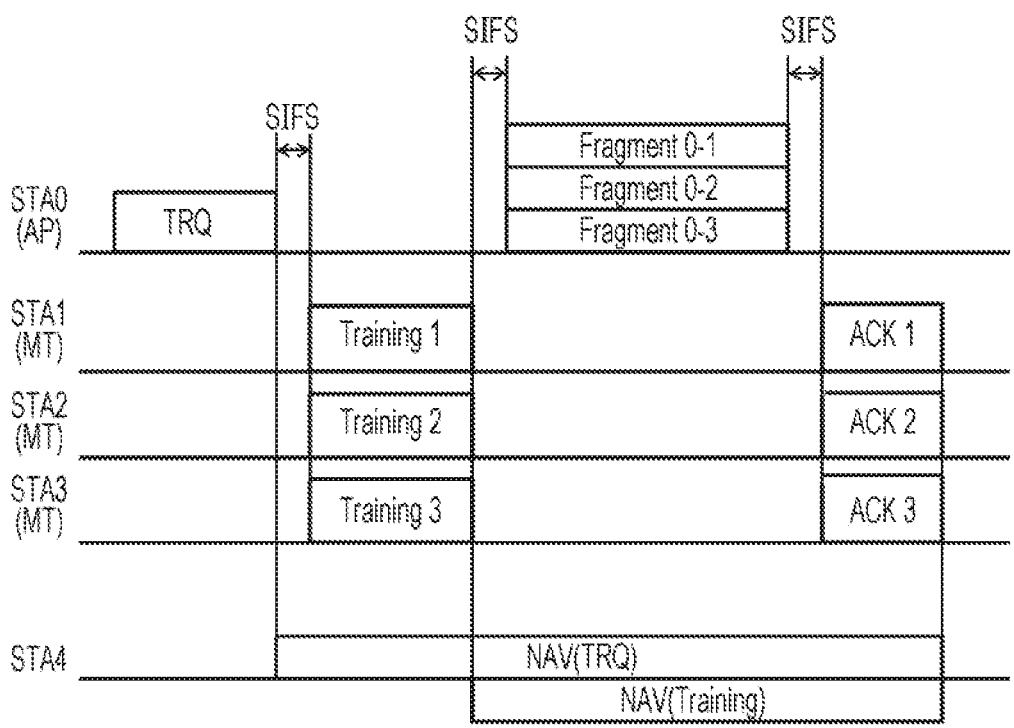
FIG. 4 illustrates an example of a processing sequence of the communication system illustrated in FIG. 1 in which the communication station STA0 operating as an access point serves as a data source, communication stations STA1 to STA3 operating as client devices serve as data destinations, and STA0 multiplexes frames to be transmitted to the communication stations STA1 to STA3 on a spatial axis and transmits the frames at the same time.

FIG. 4 illustrates an example of a communication sequence for learning the weights of the adaptive array antenna using training signals. In the example illustrated in the drawing, a communication station that performs learning transmits a Training ReQuest (TRQ) frame for requesting transmission of a training signal. Upon receiving the TRQ frame, each of the neighboring stations returns a training frame including a known sequence used for the learning process. Note that although the communication station STA4 in FIG. 4 is not illustrated in FIG. 1, the communication station STA4 is a communication station that complies with only an existing standard and that is a hidden terminal located in at least one of the communication areas of the communication stations STA0 to STA3.

The communication station STA0 serving as an access point senses a physical carrier in advance and confirms that a medium is clear. Furthermore, the communication station STA0 performs back-off and transmits a TRQ frame. At that time, the communication station STA0 has not yet learned the weights of the adaptive array antenna (i.e., the antenna elements 21-1, 21-2, . . . , and 21-N have not yet function as the adaptive array antenna). Accordingly, the communication station STA0 omnidirectionally transmits the TRQ frame.

The TRQ frame includes a field that complies with IEEE 802.11, which is an existing standard. The field contains duration information that requests the communication apparatus that is not a destination of the TRQ frame (the hidden terminal) to set, in NAV, a counter value corresponding to a duration until a signal transmitting and receiving sequence is completed.

Upon receiving a TRQ frame that does not include a destination indicating the communication station STA4, the communication station STA4 that complies with an existing standard sets a NAV counter value using the duration information included in the frame. Thus, the communication station STA4 does not perform a transmitting operation. In addition, according to the layout of the communication stations illustrated in FIG. 1, the TRQ frame transmitted from the communication station STA0 reaches each of the communication stations STA1 to STA3. In response to the TRQ frame received, after a predetermined frame interval SIFS (Short Inter Frame Space) has elapsed since the TRQ frame including a destination indicating the communication station was received, each of the communication stations STA1 to STA3 returns a training frame including a known sequence usable for training of the adaptive array antenna.

According to the present embodiment, learning of the weights of the adaptive array antenna is performed while maintaining downward compatibility with an existing standard. Therefore, the training frame has a front field and a rear field. The front field complies with IEEE 802.11, which is an existing standard. The rear field contains a known sequence for training and does not have downward compatibility with the existing standard. In order to stop a transmitting operation until neighboring stations that comply with the existing standard complete a series of signal transmitting and receiving operation, spoofing described in the drawing is performed on the front field that complies with the existing standard so that such misinterpretation that the training frame continues until subsequently performed transmission of ACK is completed occurs. Note that the spoofing technique is described in more detail in, for example, Japanese Unexamined Patent Application Publication No. 2008-252867 whose patent right has already been assigned to the applicant of the present invention.

In addition, in the example illustrated in FIG. 4, the communication stations STA1 to STA3 transmit the training frames at the same time.

At that time, the training frames may be transmitted in a time multiplexed manner. However, if the training frames are transmitted in a time multiplexed manner, a period of time needed for transmission of all of the training frames (i.e., a transmission waiting time needed for each of the neighboring stations) increases with an increase in the number of communication stations that send back the training frames (i.e., the number of communication stations to be learned). Accordingly, the throughput of the whole system decreases, and the overhead of the whole system increases. In addition, the neighboring station that can receive only a training frame transmitted at a later time on the time axis (the hidden terminal) may start a transmitting operation before the training frame arrives, since the NAV counter value disappears. Thus, collision of the carries cannot be prevented. For these reasons, according to the present embodiment, the training frames are transmitted at the same time.

In contrast, after transmission of the TRQ frame has been completed, the communication station STA0 enters a ready mode until the training frames transmitted from the communication stations STA1 to STA3, which are destinations of the TRQ frame, are received. When the training frame is received, the communication station STA0 has not yet learned for the adaptive array antenna. Accordingly, the communication station STA0 needs to receive the plurality of training frames at the same time using any one of the antenna elements. At that time, if the following three conditions are satisfied, the communication station STA0 can receive the front field sections of the training fields transmitted at the same time (the front field sections having backward compatibility with the existing standard) while preventing collision.

(1) To employ an OFDM modulation technique.
(2) To operate the oscillators of the communication stations STA1, STA2, and STA3 so that a frequency error with respect to the oscillator used in the communication station STA0 is compensated for.
(3) To make information items in the fields of the training frames transmitted from the communication stations STA1, STA2, and STA3 the same.

It is known that the OFDM modulation technique suggested in the condition (1) has advantages including its robustness to multipath fading. In addition, the condition (2) can be satisfied if the communication stations STA1, STA2, and STA3 perform frequency correction upon receiving a TRQ frame from the communication station STA0. By performing frequency correction, it is assured that the delay times when the training frames transmitted from the communication stations STA1, STA2, and STA3 at the same time reach the communication station STA0 are within a guard interval. Furthermore, as the condition (3) implies, if the information items in the fields of the communication stations STA1, STA2, and STA3 are the same, these fields can be handled as a normal delayed wave. Thus, the training frames can be received at the same time by using a single antenna element.

In addition, the communication station STA0 receives the rear field of the training frame that contains a known sequence for training and that does not have backward compatibility with the existing standard by using the antenna elements 21-1, 21-2, . . . , and 21-N. By assigning a particular code sequence to each of the communication stations STA1, STA2, and STA3 as the known sequence for training in advance, the communication station STA0 can spatially separate the sequences. However, if the number of communication stations that perform a space division multiple access through space division is increased, the length of the known sequence inevitably increases since the communication stations need to be distinguished from one another.

Subsequently, the communication station STA0 learns the weights of the adaptive array antenna using the known sequences and a predetermined adaptive algorithm, such as the RLS algorithm. Thereafter, the antenna elements 21-1, 21-2, . . . , and 21-N of the communication station STA0 can function as an adaptive array antenna, and the communication station STA0 can perform the space division multiple access.

In contrast, upon receiving the above-described training frame that does not include STA4 as the destination, the communication station STA4 that complies with only the existing standard misunderstands that the training frame continues until the subsequent ACK frame is transmitted due to spoofing (as described above). Thus, the communication station STA4 does not perform a transmitting operation.

After a predetermined frame interval SIFS has elapsed since the communication station STA0 received the training frames sent from the communication stations STA1, STA2, and STA3, the communication station STA0 transmits data frames (Fragment0-1, Fragment0-2, and Fragment0-3) to the communication stations STA1, STA2, and STA3, respectively. By using the above-described learned weights of the adaptive array antenna, the communication station STA0 can transmit a plurality of data frames through space division multiple access at the same time.

In contrast, upon receiving the data frames (Fragment0-1, Fragment0-2, and Fragment0-3) destined for the communication stations STA1, STA2, and STA3, the communication stations STA1, STA2, and STA3 send back ACK frames (ACK1, ACK2, and ACK3), respectively, at the same time after the predetermined frame interval SIFS has elapsed.

The plurality of antenna elements 21-1, 21-2, . . . , and 21-N of the communication station STA0 have already functioned as an adaptive antenna. Accordingly, the communication station STA0 can spatially separate the plurality of ACK frames (ACK1, ACK2, and ACK3) received at the same time for each of the users. For example, by storing, in the ACK frames, the addresses of the communication stations STA1, STA2, and STA3 as transmitter addresses, the communication station STA0 can identify the sources of the received ACK frames. In addition, if the known sequences for training are stored in even the ACK frames, the communication station STA0 can change the learned weights of the adaptive array antenna in accordance with the known sequences for training stored in the received ACK frames so that the weights can adaptively follow a change in the environment.

Upon receiving the data frame that is not destined for the communication station STA4, the communication station STA4 that complies with the existing standard sets a NAV counter value on the basis of the duration information contained in the frame. In this way, the communication station STA4 stops a transmitting operation. In addition, upon receiving the ACK frame that is not destined for the communication station STA4, the communication station STA4 that complies with the existing standard sets a NAV counter value on the basis of the duration information contained in the frame. In this way, the communication station STA4 stops a transmitting operation.

As can be seen from an example of the communication sequence illustrated in FIG. 4, the communication station STA0 that performs a space division multiple access can appropriately learn the weights of the adaptive array antenna. Furthermore, after the communication station STA0 has learned the weights of the adaptive array antenna, the communication station STA0 can share wireless resources on a spatial axis with a plurality of users and multiplex a plurality of data frames destined for the plurality of users. Thereafter, the communication station STA0 can transmit the data frames. In this way, the throughput can be increased in the case of one-to-many communication, that is, communication among a plurality of users.

In this case, in general, a wireless LAN employs a packet communication scheme. The amounts of traffic that the users desire differ from user to user. Therefore, the lengths of packets (frames) differ from each other. For example, in the example of a communication sequence illustrated in FIG. 4, it is desirable that the lengths of a TRQ frame, a training frame, and an ACK frame be the same. However, for a plurality of data frames transmitted from the communication station STA0, the lengths of the frames transmitted from the MAC layer to the PHY layer may not be the same due to a difference in a transmitted amount of data from destination to destination.

However, when frames destined for a plurality of users are multiplexed and simultaneously transmitted through the space division multiple access scheme and if the total transmission power is abruptly changed due to a difference among the frame lengths, an unstable AGC operation may disadvantageously occur at the receiver side due to an abrupt change in the received power (as described above).

Figure 5:
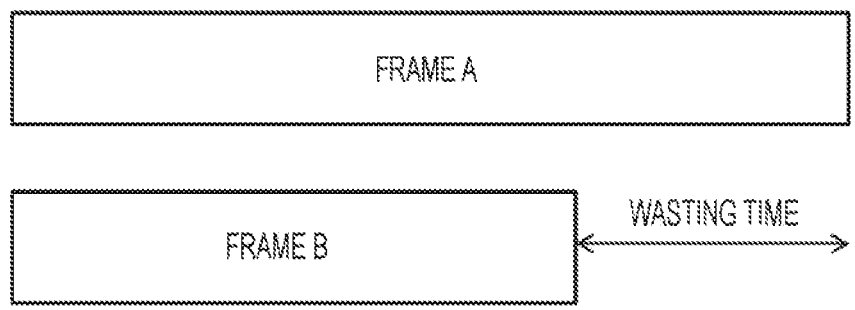
FIG. 5 illustrates frames A and B that have different lengths and that are multiplexed on the same time axis.

In addition, if some of the frames to be multiplexed are terminated and the other frames continue to be transmitted, the communication bandwidth is not efficiently used. Thus, the effect of the space division multiple access is decreased. FIG. 5 illustrates frames A and B that have different lengths and that are multiplexed on the same time axis. As can be seen in the example illustrated in the drawing, the length of the frame B is shorter than the length of the frame A, and after transmission of the frame B has been completed, the communication bandwidth is wasted.

Therefore, even when the lengths of the frames multiplexed at the same time differ from one another, all the transmitted frames need to finally have the same frame length.

Figure 6:
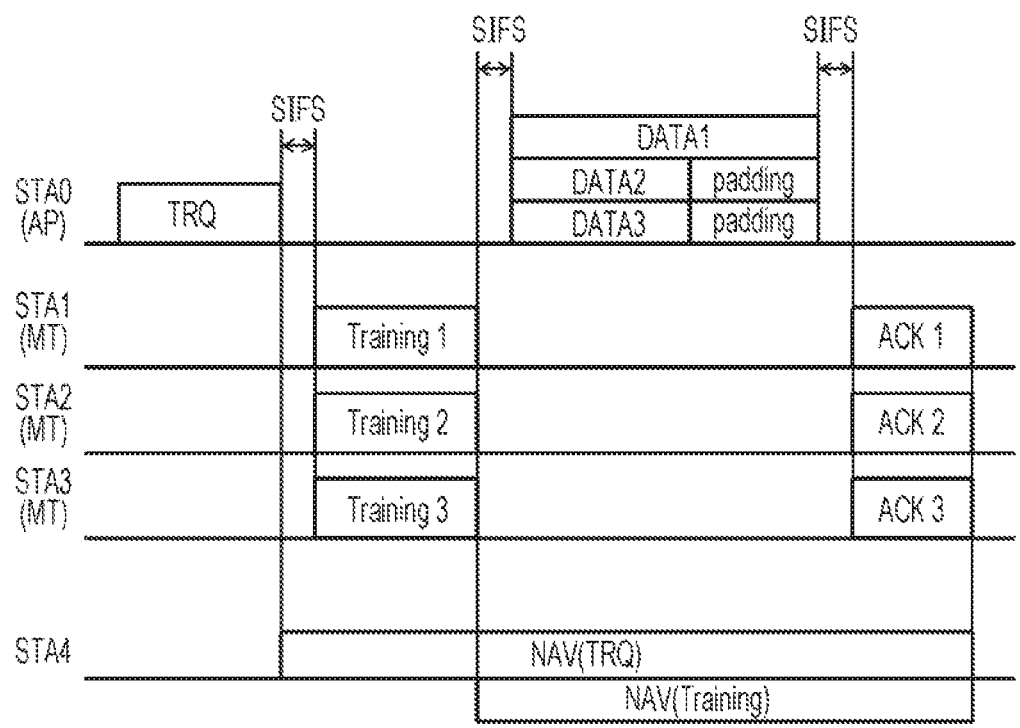
FIG. 6 illustrates the case in which when a plurality of frames having different lengths are multiplexed at the same time, the frames are subjected to a padding process.

For example, among the spatially multiplexed frames, the frames having short lengths may be padded in the PHY layer so that the frame lengths are made the same. FIG. 6 illustrates the case in which, in the example of the communication sequence illustrated in FIG. 4, when data to be transmitted to STA1 to STA3 at the same time are delivered from a higher layer (e.g., the MAC layer) and if the amount of each of data items to be transmitted to STA2 and STA3 (DATA2 and DATA3) is smaller than that of a data item to be transmitted to STA1 (DATA1), the data items to be transmitted to STA2 and STA3 (DATA2 and DATA3) are padded so that each of the lengths of the DATA2 and DATA3 is the same as the length of the data item having a longer length (DATA1). Thus, the lengths of the frames finally transmitted from the PHY layer are made the same.

However, the padding operation causes overhead since actual data are not included. Therefore, it is desirable that the lengths of frames be adjusted without using a padding operation.

Accordingly, the present inventors have developed a technique for adjusting the lengths of two or more frames having short lengths so that the lengths match the length of a frame having a long length by integrating the frames into a single frame through Aggregation. In IEEE 802.11n for high-speed communication, the term "Aggregation" is known as a frame format that reduces overhead by configuring a single physical layer section from a plurality of frames.

Figure 7:
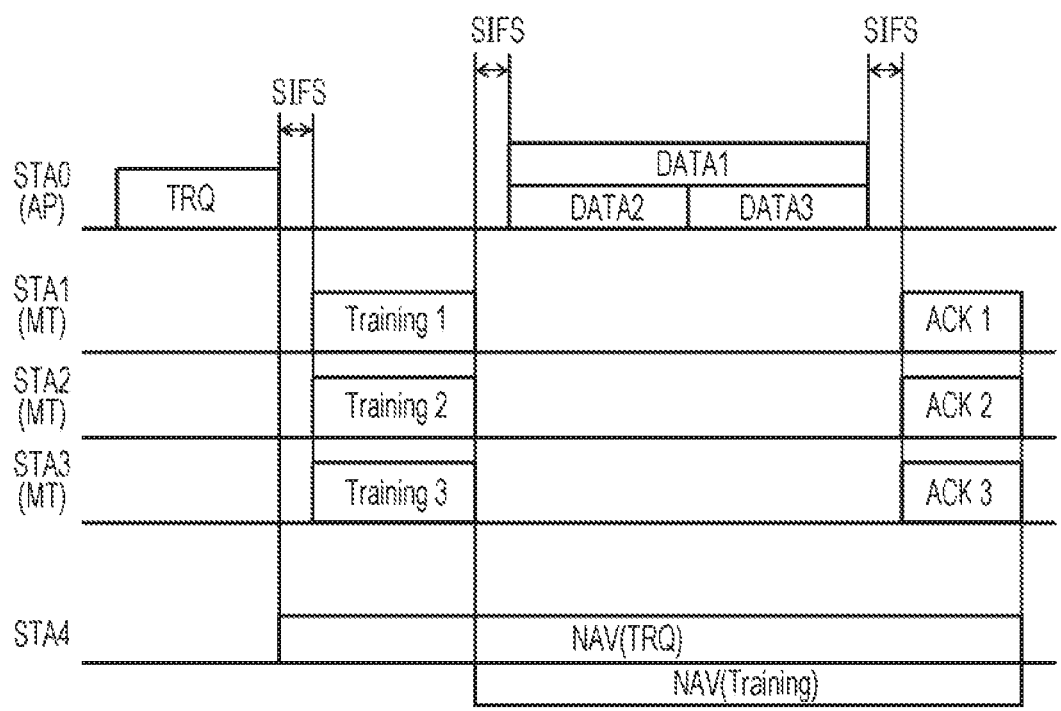
FIG. 7 illustrates the case in which at least two frames having short lengths are integrated into a single frame by Aggregation so that the lengths of frames are adjusted with respect to the length of a frame having a long length.

FIG. 7 illustrates the case in which, in the example of the communication sequence illustrated in FIG. 6, when data to be transmitted to STA1 to STA3 on the same time are delivered from a higher layer (e.g., the MAC layer) and if the amount of each of data items to be transmitted to STA2 and STA3 (DATA2 and DATA3) is smaller than that of a data item to be transmitted to STA1 (DATA1), the data items to be transmitted to STA2 and STA3 (DATA2 and DATA3) are integrated into a single frame by Aggregation so that the length of the DATA2 and DATA3 is the same as the length of the data item having a longer length (DATA1). Thus, the lengths of the frames finally transmitted from the PHY layer are made the same.

Upon receiving an Aggregation frame, each of the communication stations may refer to the destination information contained in the top portion of the frame and extract the data portion destined for the communication station. For example, upon receiving the Aggregation frames including data items destined for STA2 and STA3, each of the communication stations STA2 and STA3 recognizes that the frame includes a data item destined for itself using the destination information in the top portion of the frame and determines which data item in the frame is destined for itself using the header information attached to each of the data items. In this way, each of the communication stations STA2 and STA3 retrieves the desired data item.

The access point STA0 may employ a scheme in which the MIMO antenna weight used when an Aggregated frame is transmitted is determined as the sum of the MIMO antenna weights used when the access point STA0 individually transmits a frame to all of the communication stations. In the example of the communication sequence illustrated in FIG. 6, since the transmission power used for the communication stations is divided for the communication stations STA1, STA2, and STA3, each transmission power is one third of the total power. In contrast, in the example of the communication sequence illustrated in FIG. 7, the data items destined for STA2 and STA3 are subjected to Aggregation, the power needed for the two communication stations need not be separated. That is, by using Aggregation in a space division multiple access scheme, the transmission power used for each of the communication stations is reduced to one half the total power. Thus, the quality of communication can be increased.

In addition, as illustrated in FIG. 7, after the communication stations STA1 to STA3 that receive the Aggregation frames complete reception of all of the Aggregation frames, the communication stations STA1 to STA3 send back ACK frames (ACK1, ACK2, and ACK3) destined for STA0, which is the source of the Aggregation frames, at the same time. For the returned ACK frames, the antenna elements 21-1, 21-2, . . . , and 21-N of the communication station STA0 have already functioned as an adaptive antenna. Accordingly, the antenna elements 21-1, 21-2, . . . , and 21-N can spatially separate the plurality of ACK frames (ACK1, ACK2, and ACK3) received at the same time for each of the users (as described above).

Figure 8:
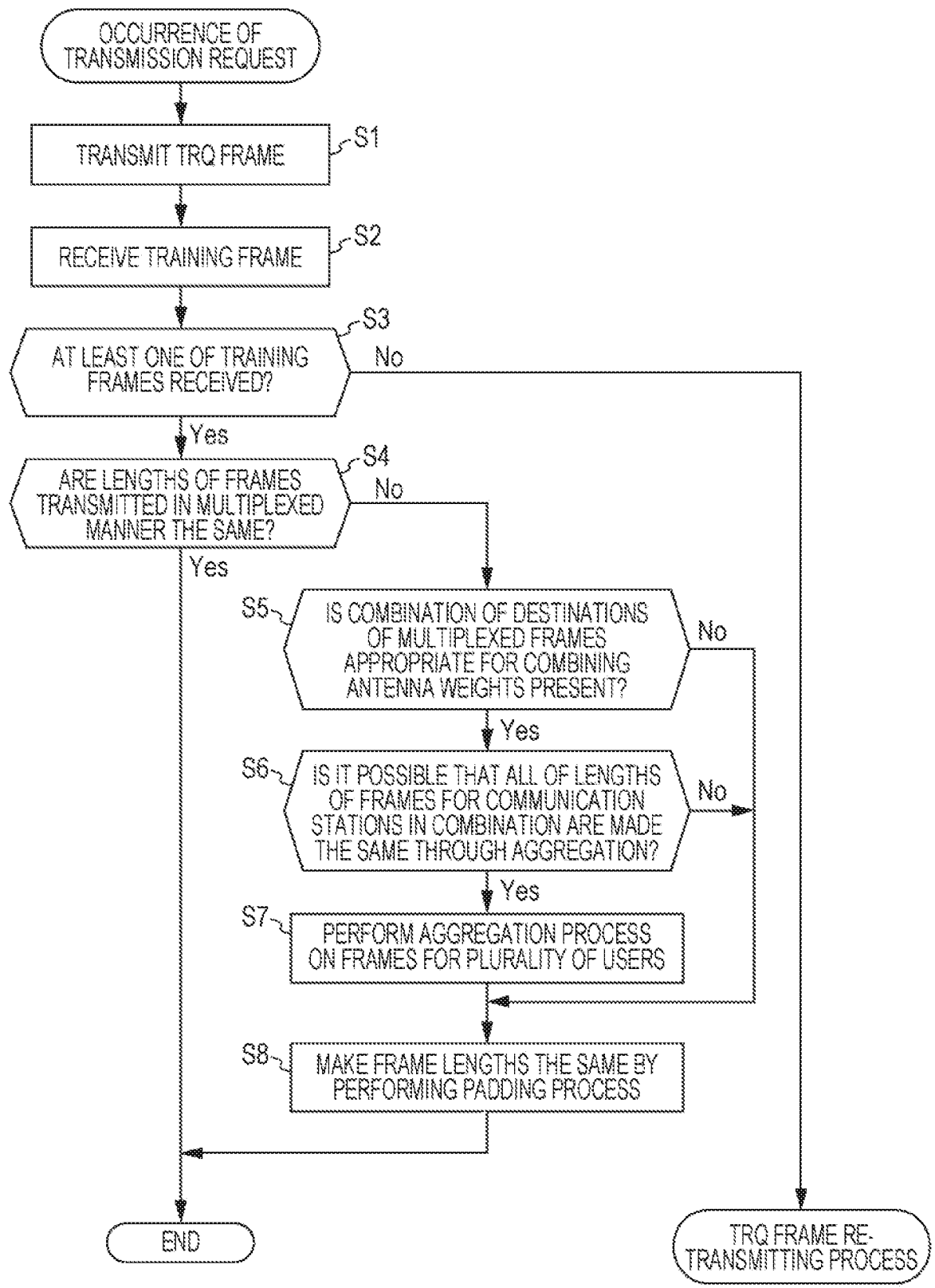
FIG. 8 is a flowchart of a processing sequence executed by the communication apparatus illustrated in FIG. 2 when, in the communication sequence illustrated in FIG. 7, the communication apparatus functions as an access point (STA0) and transmits frames destined for a plurality of communication stations at the same time in a multiplexed manner.

FIG. 8 illustrates a processing sequence in the form of a flowchart in which, in the communication sequence illustrated in FIG. 7, the communication apparatus illustrated in FIG. 2 functions as the access point (STA0) and transmits frames destined for a plurality of communication stations at the same time in a multiplexed manner. The access point starts the processing sequence illustrated in FIG. 8 in response to, for example, the occurrence of a data transmission request or a data reception request from a higher-layer application.

The access point examines that the medium is clear by performing a physical carrier sense in advance and further performs back-off. In this way, if the access point enters a communicable mode, the access point transmits a training request (TRQ) frame to one or more communication stations (STA1 to STA3) to which the access point wants to transmit data in a multiplexed manner (step S1).

Subsequently, after a predetermined frame interval SIFS (Short Inter Frame Space) has elapsed since the TRQ frame was transmitted, the access point waits until it receives training frames sent back from the receivers of the training request (STA1 to STA3) (step S2).

At that time, if the access point has not received a training frame from any one of the receivers of the training request (STA1 to STA3) (No in step S3), the processing proceeds to a re-transmitting process of the TRQ frame. However, the details of the frame re-transmitting process are not provided here.

However, if the access point can receive a training frame from at least one of the receivers of the training request (STA1 to STA3) (Yes in step S3), the access point learns the weights of the adaptive array antenna using a known sequence for training included in each of the received training frames.

Thereafter, the access point determines whether the lengths of the multiplexed frames destined for the communication stations from which the access point was able to receive the training frames are the same (step S4).

Here, if the lengths of the frames to be multiplexed are the same (Yes in step S4), the access point directly multiplexes the data frames destined for the communication stations from which the access point was able to receive the training frames and transmits the data frames after a predetermined frame interval SIFS has elapsed since the training frames were received. Thereafter, this processing routine is completed.

At that time, by using the learned weights of the adaptive array antenna, the access point can transmit the data frames destined for the plurality of client devices at the same time through space division multiplexing. However, the access point does not transmit the data frames to the client device from which the access point has not received a training frame, since learning is not performed for the client device and it is uncertain as to whether or not the client device is present within the communication area.

However, if the lengths of the frames to be multiplexed are not the same (No in step S4), the access point determines whether among the plurality of communication stations that are destinations of the multiplexed frames (STA1 to STA3), a combination appropriate for combining the antenna weights is present (e.g., a combination of communication stations located in the vicinity is present) (step S5).

At that time, one of techniques for determining whether a combination of communication stations located in the vicinity is present is to compare the values of the antenna weights of the communication stations with one another. That is, the access point can determine whether the values of the antenna weights of one of the communication stations are close to those of another communication station as a predetermined reference. If the values of the antenna weights of the communication stations are close to each other, the access point can determine that a combination of the communication stations is appropriate. For example, let STA0 have three antennas. In addition, a combination of the antenna weights of the communication station STA1 indicates that the weight of an antenna 1 is large, the weight of an antenna 2 is medium, and the weight of an antenna 3 is small. A combination of the antenna weights of the communication station STA2 indicates that the weight of the antenna 1 is large, the weight of the antenna 2 is small, and the weight of the antenna 3 is medium. A combination of the antenna weights of the communication station STA3 indicates that the weight of the antenna 1 is large, the weight of the antenna 2 is small, and the weight of the antenna 2 is medium. Then, since the values of the weights of STA2 are close to the values of the weights of STA3, it can be determined that STA2 is appropriately combined with STA3. In addition, another technique for determining whether a combination of communication stations is a combination of communication stations located in the vicinity is to determine whether the locations of communication stations are in the vicinity on the basis of information provided by GPSs (Global Positioning Systems) mounted in the communication stations and determine that a combination of the communication stations located within a distance that satisfies a predetermined reference is appropriate.

If a combination of the communication stations appropriate for combining the antenna weights is found (Yes in step S5), it is determined whether the lengths of all of the frames destined for the communication stations in the combination and multiplexed at the same time can be made the same by performing Aggregation (step S6).

Thereafter, if the lengths of all of the frames multiplexed at the same time can be made the same by performing Aggregation (Yes in step S6), an Aggregation process is performed on the frames of a plurality of users (step S7). More specifically, the MIMO antenna weights that are the sums of the MIMO antenna weights used when the access point individually transmits a frame to all of the communication stations that are the destinations of the aggregated frames are employed.

Thereafter, if the length of the Aggregated frame is not completely the same as the length of another frame that is multiplexed at the same time, one of the frames is appropriately padded so that the lengths of all of the frames are made the same (step S8).

However, if a combination of the communication stations appropriate for combining the antenna weights is not found (No in step S5) or if the lengths of all of the frames cannot be made the same even when Aggregation is performed (No in step S6), Aggregation of the frames for multiple users is stopped, and the lengths of all of the frames are made the same by using only a padding process (step S8).

Subsequently, after the predetermined frame interval SIFS has elapsed since training frames were received, the frames subjected to adjustment of the frame lengths are transmitted in a multiplexed manner. Thereafter, this processing routine is completed.

Figure 9:
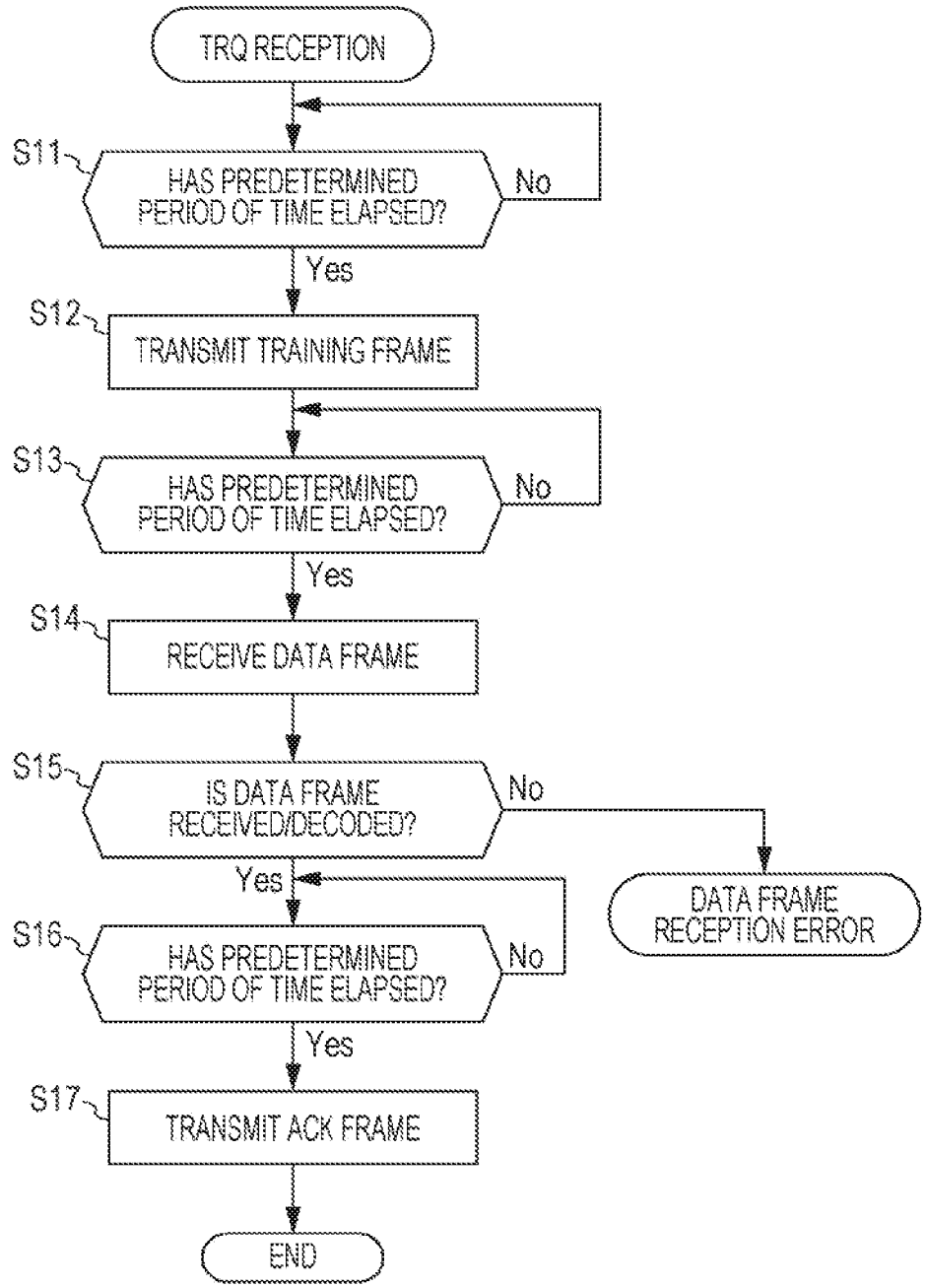
FIG. 9 is a flowchart of a processing sequence executed by the communication apparatus illustrated in FIG. 2 when, in the communication sequence illustrated in FIG. 7, the communication apparatus functions as any one of the client devices (STA1 to STA3) and receives frames transmitted from an access point at the same time in a multiplexed manner.

FIG. 9 illustrates a processing sequence in the form of a flowchart in which in the communication sequence illustrated in FIG. 7, the communication apparatus illustrated in FIG. 2 operates as any one of the client devices (STA1 to STA3) and receives the frames multiplexed at the same time from the access point. At that time, upon receiving a TRQ frame from the access point (STA0), each of the client devices (STA1 to STA3) starts the processing sequence illustrated in FIG. 9. Note that at that time, each of the client devices corrects a frequency error using, for example, L-LTF of the header portion of the received TRQ frame, and it is assured that clock errors among the client devices are within a guard interval.

After a predetermined frame interval SIFS has elapsed since the client device received the TRQ frame from the access point (Yes in step S11), the client device sends back a training frame to the access point (step S12).

At that time, the client device corrects a frequency error using the received TRQ frame. Accordingly, when a plurality of the client devices that send back training frames are present, it is assured that the times at which the training frames arrive at the access point are within the guard interval. Thus, the access point can receive the plurality of training frames at the same time using a single antenna element.

Subsequently, after the predetermined frame interval SIFS has elapsed since the client device transmitted the TRQ frame (Yes in step S13), the client device enters a ready mode until a data frame transmitted from the access point is received. (step S14).

At that time, if the client device cannot receive a data frame or if the client device cannot decode a received data frame due to a frame error (No in step S15), the client device determines that reception of a data frame is failed. Thus, this processing routine is completed. Alternatively, the client device may transmit NACK to the access point in order to ask the access point to re-transmit the data frame.

However, when the client device can receive a data frame from the access point (Yes in step S15) and if the predetermined frame interval SIFS has elapsed since the data frame was received (Yes in step S16), the client device sends back an ACK frame to the access point (step S17). In this way, this processing routine is successfully completed.

As can be seen from FIGS. 7 and 8, in the communication system according to the present embodiment, even when the lengths of frames for users are not the same at a point in time when the communication apparatus receives a transmission request from a higher-layer application, the communication apparatus can integrate at least two frames having short lengths into a frame having a long length through Aggregation and finally transmit the frames having the same frame length after multiplexing the frames at the same time.

The term "Aggregation" refers to a frame format for reducing overhead by configuring a single physical-layer data portion from a plurality of frames in IEEE 802.11n regarding high-speed communication. According to the present embodiment, by integrating frame aggregation into a space division multiple access scheme, overhead can be reduced and a high throughput can be obtained in one-to-many communication.

In addition, when the communication apparatus multiplexes a plurality of frames having a variable-length format at the same time, the communication apparatus adjusts the frame lengths so that the frame lengths are the same. In this way, an abrupt change in the total transmission power can be prevented. On the receiver side of the multiplexed frames, an unstable AGC operation caused by an abrupt change in the received power can be prevented. Furthermore, since, in terms of an Aggregation frame, the number of frames to be multiplexed can be reduced, the transmission power used per destination communication apparatus on the transmitter side can be increased. Therefore, an increase in the communication quality can be expected.

INDUSTRIAL APPLICABILITY

While the present invention has been described in detail with reference to particular embodiments, various modifications and alterations of this invention will become apparent to those skilled in the art without departing from the scope and principles of this invention.

While the present specification has been described with reference to embodiments employing a new wireless LAN standard, such as IEEE 802.11ac aiming at ultra-high throughput (1 Gbps), the scope of the invention is not limited thereto. For example, the present invention is similarly applicable to another wireless LAN system in which wireless resources on a spatial axis are shared by a plurality of users and a variety of wireless systems other than a LAN.

That is, it is understood that the embodiments described herein are for illustrative purposes only and the above disclosure is not intended to be limiting. The scope of the invention should be determined by the appended claims.

REFERENCE SIGNS LIST 20-1, 20-2, transmitting and receiving branch
21-1, 21-2, antenna element
22-1, 22-2, duplexer
23-1, 23-2, transmission processing unit
24-1, 24-2, reception processing unit
25 data processing unit
30 transmitting and receiving branch
31 antenna element
32 duplexer
33 transmission processing unit
34 reception processing unit
35 data processing unit

The invention claimed is:

1. A communication apparatus, comprising:
circuitry configured to:
generate a plurality of MAC frames for transmission via a multiplex operation;
aggregate at least two MAC frames of the generated plurality of MAC frames into a single aggregated MAC frame as a first PHY data;
pad, by PHY padding, the first PHY data based on a length of the first PHY data that is shorter than a length of a second PHY data, to generate a plurality of PHY data that have a same length;
transmit a PHY frame including the generated plurality of PHY data using a multi user-multi input multi output (MU-MIMO) operation to a plurality of receiving communication apparatuses,
wherein the PHY frame comprises a training sequence having backward compatibility with a conventional standard; and
receive, from the plurality of receiving communication apparatuses, a plurality of ACK frames in response to the transmitted PHY frame,
wherein the plurality of ACK frames is transmitted after a first duration from reception of the PHY frame.

2. The communication apparatus according to claim 1, wherein the circuitry is further configured to adjust lengths of the plurality of PHY data to make the lengths same.

3. The communication apparatus according to claim 2, further comprising a plurality of antenna elements configured to function as an adaptive array antenna by assignment of weights to the plurality of antenna elements.

4. The communication apparatus according to claim 3, wherein the circuitry is further configured to pad, by PHY padding, a MAC frame of the plurality of MAC frames to have the same length for each of the plurality of PHY data, based on the aggregation that fails to make the length of the plurality of PHY data same.

5. The communication apparatus according to claim 1, wherein the plurality of ACK frames is transmitted concurrently by the plurality of receiving communication apparatuses.

6. A communication method, comprising:
in a communication apparatus:
generating a plurality of MAC frames for transmission via a multiplex operation;
aggregating at least two MAC frames of the generated plurality of MAC frames into a single aggregated MAC frame as a first PHY data;
padding, by PHY padding, the first PHY data based on a length of the first PHY data that is shorter than a length of a second PHY data, to generate a plurality of PHY data having a same length;
concurrently transmitting a PHY frame including the generated plurality of PHY data using a multi user-multi input multi output (MU-MIMO) operation to a plurality of receiving communication apparatuses,
wherein the PHY frame comprises a training sequence having backward compatibility with a conventional standard; and
receiving, from the plurality of receiving communication apparatuses, a plurality of ACK frames in response to the transmitted PHY frame,
wherein the plurality of ACK frames is transmitted after a first duration from reception of the PHY frame.

7. The communication method according to claim 6, wherein the plurality of ACK frames is transmitted concurrently by the plurality of receiving communication apparatuses.

8. A communication apparatus, comprising:
circuitry configured to:
receive a PHY frame including a first PHY data and a second PHY data that are concurrently transmitted from an access point apparatus via a multi user-multi input multi output (MU-MIMO) operation;
decode the first PHY data addressed to the communication apparatus;
wherein the PHY frame comprises a training sequence having backward compatibility with a conventional standard; and
transmit an ACK frame in response to the reception of the PHY frame, wherein
the ACK frame is transmitted after a first duration from the reception of the PHY frame,
the PHY frame is padded based on a length of the first PHY data that is shorter than a length of a second PHY data, and
the first PHY data is generated by aggregation of at least two MAC frames into a single aggregated MAC frame.

9. The communication apparatus according to claim 8, wherein a plurality of ACK frames is transmitted concurrently by a plurality of receiving communication apparatuses.

10. The communication apparatus according to claim 9, wherein the access point apparatus is configured to adjust lengths of a plurality of PHY data to make the lengths same.

11. The communication apparatus according to claim 10, further comprises a plurality of antenna elements configured to function as an adaptive array antenna by assignment of weights to the plurality of antenna elements.

12. The communication apparatus according to claim 11, wherein the access point apparatus pads, by PHY padding, a MAC frame of a plurality of MAC frames to have the same length for each of the plurality of PHY data, based on the aggregation that fails to make the length of the plurality of PHY data same.

* * * * *